May 2, 1961 — K. H. LANGE — 2,982,192
PHOTOGRAPHIC CAMERAS
Filed Feb. 14, 1957 — 3 Sheets-Sheet 1

INVENTOR
KARL HEINZ LANGE
ATTORNEY

INVENTOR
KARL HEINZ LANGE

May 2, 1961 K. H. LANGE 2,982,192
PHOTOGRAPHIC CAMERAS
Filed Feb. 14, 1957 3 Sheets-Sheet 3

INVENTOR:
KARL HEINZ LANGE
ATTORNEY

United States Patent Office 2,982,192
Patented May 2, 1961

2,982,192
PHOTOGRAPHIC CAMERAS

Karl Heinz Lange, Bunde, Westphalia, Germany, assignor to Balda-Kamera-Werk Rudolf Gruter K.G., Bunde, Westphalia, Germany, a company of Germany Filed Feb. 14, 1957, Ser. No. 640,191

Claims priority, application Germany Apr. 27, 1956

6 Claims. (Cl. 95—42)

The increasing demands with regard to the cheapness and equipment of photographic cameras have led to developments in different directions in order to find means to replace the very expensive helical groove in a camera having total lens displacement, for the purpose of distance adjustment.

In this connection three fundamental systems may be discerned.

(1) A construction in which one or more rotatably disposed radius curves compel a spring-loaded, lever controlled lens carrier or one guided as a complete unit to carry out the movement of adjustment. This embodiment only differs in general from the earlier customary helical groove in that a possible play is compensated for by means of a spring. The disadvantage lies in the increased friction and accordingly in that with the user holding the camera the system is unstable.

(2) A construction in which the guiding of the displaceable lens carrier is effected with the aid of pegs or swallow-tailed shaped guides and the movement of displacement is transmitted by means of a single or double arm lever or rocking lever through a corresponding displacement drive of the adjusting member.

(3) A sub-form of the construction described in paragraph 2 with the characteristic that the movement of the guided lens carrier is controlled by an eccentric disc or a spiral-shaped curve. In this construction however, the guidance of the lens carrier remains in rectilinear guides. The disadvantage in all constructions is the high costs and space requirement for the rectilinear guideways as well as the frequently observed limited accuracy of the adjustment. The present invention aims at the avoidance of the disadvantages attaching to the known adjustment devices for lens. According to the invention, eccentrics are used in the form of two shafts, which are caused to rotate eccentrically through eccentric supports or bores, so mounted in the camera housing that they compel a lens carrier, which is provided with slots in which the shafts engage, to rotate in phase with plane-parallel movement in the direction of the optical axis without the necessity for additional guide-ways to cause that plano-parallel movement. In this construction the eccentric shafts undertake the sole plano-parallel guiding and directing of the lens carrier which is moved moreover only in a coarse guide which has no accuracy of finish and is accordingly cheaply manufacturable. Contact between the eccentrics and the lens carrier may take place at least at three points which lie in a plane transverse to the direction of displacement. As is known three points are sufficient to define adequately a plane. On constructional grounds however, the contact takes place between the eccentric and the lens carrier preferably at four points which lie at the corners of a rectangle, which extends transversely to the direction of displacement or at two parallel contact lines. The in-phase rotation of the eccentric is attained by means of a rack and pinion or a steering lever and tie rod, or like means. Furthermore, the device can be simultaneously employed for control of the distance or range meter or measuring means, in which one of the selected driving parts is provided with a curve through which the movement is transmitted in the desired relationship to the range meter.

In order to avoid inaccuracies of the guide or the play between the eccentrics and the lens one side of the slot in the lens carrier can be formed of, or bounded by, a strong leaf spring. In this way the eccentric shaft always lies uniformly against the other side of the slot, and any play or clearance is cut out. Likewise the lateral play of the lens carrier in the camera housing can be compensated for in fabrication by one or more lateral springs or strips of plush. It is further obvious that the coarse guide of the lens carrier for the purpose of the invention may be cylindrical instead of prismatic.

In consequence of the use of eccentrics and circular transmission means, for example tooth segment and rack, the relationship between the movement of the lens and the rotation movement is not exactly rectilinear but closely approximates to sine form. By the selection of a suitable radius and correspondingly large eccentricity it is however possible to set the requisite stroke of adjustment so that the region of displacement remains in the neighbourhood of the turning point of the sine diagram movement of the lens carrier and the transmission characteristic is substantially rectilinear.

One embodiment of the invention is illustrated in the drawings. On these—

Figure 1:
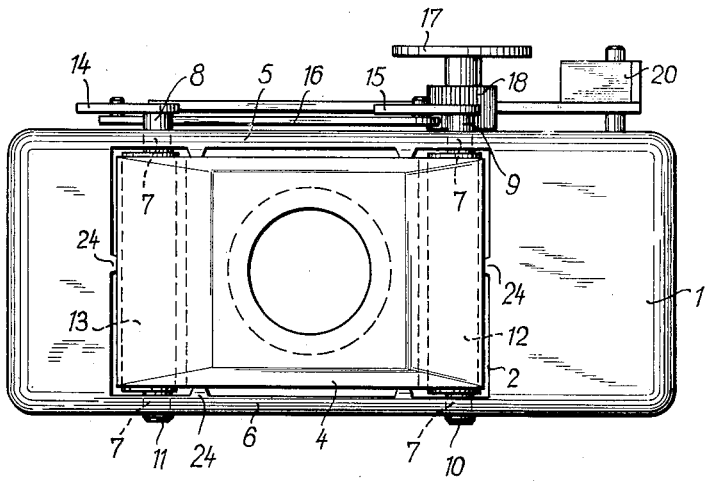
Figure 1 is a front view of the lens displacement device.
Figure 2:
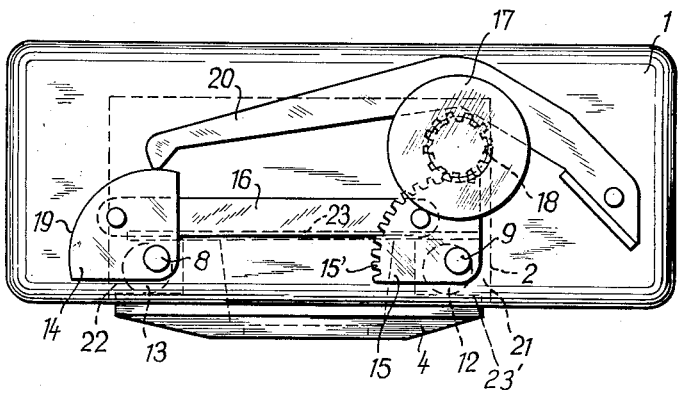
Figure 2 is a side view of the arrangement according to Figure 1.

In the drawings 1 is a housing, which has a boxed shaped recess 2 which serves for reception of the lens carrier 4. In the walls 5 and 6 of the box are four bores 7 in which the eccentric pins 8, 9, 10, and 11 of the two similar shafts 12 and 13 are mounted. The eccentric pins 8 and 9 project inwardly through the holes 7 of the wall 5 and are, in the case of this example, so connected above the wall through the rocking levers 14 and 15, in the shape of sectors, and tie rod 16, that the eccentric shafts 12 and 13 are positively rotated in phase. The sector 15 is provided at its circumference with teeth 15¹ in which the gear 18, mounted co-axially with the adjustment disc 17 engages. The sector 14 can accordingly be used through the curve 19 to effect in a known way the control of a distance meter 20. The lens carrier 4 is provided with two recesses or slots 21 and 22 which correspond in their breadth to the diameter of the eccentric shafts 12 and 13 which they engage. Any possible play can be avoided in that one side of the slots 21 and 22 is formed by a leaf spring or springs 23, which always press the eccentric shaft against the other side 23' of the slot. The coarse guidance of the lens carrier within the box shaped recess 2 is facilitated by the application of longitudinal ribs 24 which reduce the bearing surfaces and friction. Likewise for the support of this guide additional lateral springs, strips of plush or the like (not illustrated) can be provided without any of these means requiring special precision.

The transmission of the adjustment movement of the adjustment disc 17 to the lens carrier 4 proceeds in the following way;

The adjustment disc 17 imparts through the gear 18 and the teeth 15¹ of the sector 15 rotary movement, which is itself transmitted through the pins 9 and 10 to the eccentric shaft 12, as well as through the tie rod 16, the sector 14 and the pins 7 and 8 to the eccentric shaft 13. The slots 21 and 22 which receive the eccentric shafts 12 and 13, communicate the movement further to the lens carrier 4 and guarantee with the in-phase rotation of the eccentric shafts an exactly plano-parallel displacement of the lens carrier 4 in the direction of the optical axis proportional to the displacement given through the eccentricity and the angle of rotation of the eccentric shafts 12 and 13.

The error of a scale applied to the displacement disc 17 with an arrangement of this kind giving a sine form is of no practical significance when the eccentricity and the radius of both shafts 12 and 13 are so large that for adjustment of the focus difference only a zone in the neighbourhood of the turning point of the sine curve is used.

Figure 3:
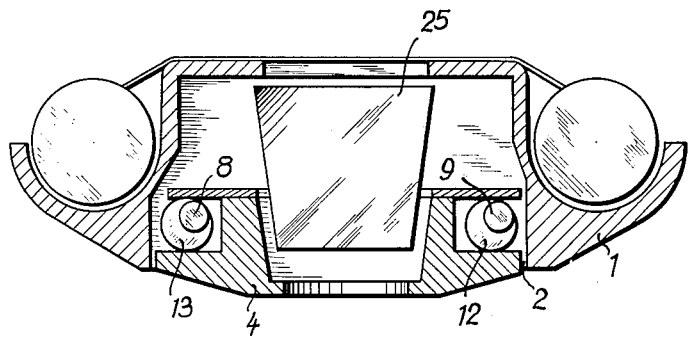
Figure 3 is a section through a monocular mirror reflex camera.
Figure 4:
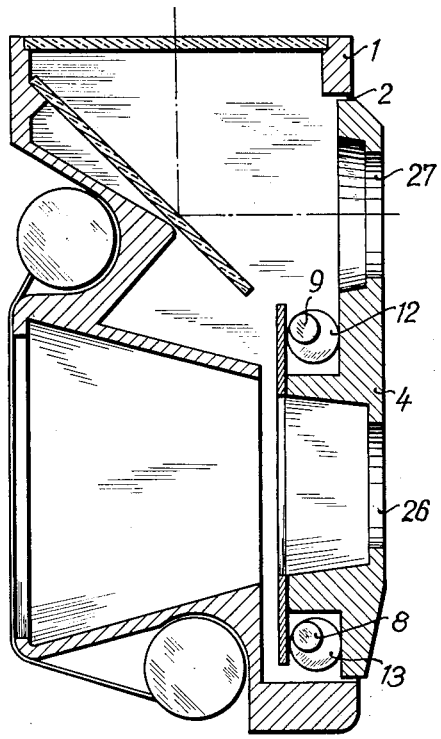
Figure 4 is a section through a binocular mirror reflex camera.

Examples for the use of the invention in mirror reflex cameras are given in Figures 3 and 4. Of these Figure 3 relates to a monocular mirror reflex camera in which the invention is particularly advantageously carried out in that with the omission of the usual worm gear drive or spiral groove between the eccentrics 12 and 13 space is obtained for the folding mirror 25 which can project relatively further into the lens carrier 4. This permits the lens carrier to be moved substantially nearer than hitherto to the film, which is of importance in many cases, for example, in the use of central closures with wide angle lens.

Figure 5:
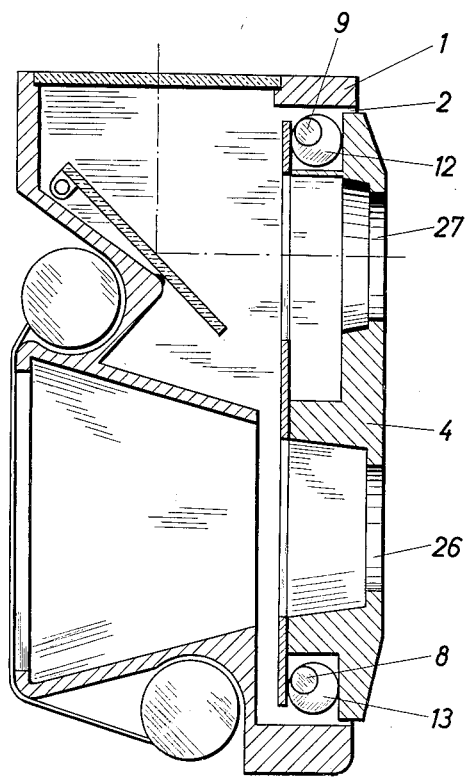
Fig. 5 is a section through a binocular mirror reflex camera in a somewhat modified form.

Figure 4 shows in section a binocular mirror reflex camera in which likewise through the invention any tendency to staggering of the lens carrier is prevented and accordingly the optical ratios are guaranteed at a maximum. In this example the eccentric guide 12, 13 is provided directly in the neighbourhood of the receiving lens 26. It is however, also possible (as seen in Fig. 5) to arrange the upper eccentric 12 above the viewing lens 27 whereby the base of the guide is extended increasing its accuracy.

As will be clear the invention permits many forms of use and is adapted to solve the problem of lens guidance in a particularly advantageous manner.

I claim:

1. In a photographic camera having a stationary film plane arrangement, a camera body, a lens carrier having an elongated slot on each side disposed fully within said carrier and extending the full length thereof, said slots being open in a direction laterally of the axial movement of said carrier, one wall of said slot consisting of leaf spring means, means supporting and holding said lens carrier in the camera for displacement in the direction of the optical axis, lens carrier guide means integral with said camera body, an elongated eccentric shaft disposed within each of said slots in bearing relation against the full length of a wall of said slot, means coupling said eccentric shafts for enforcing their remaining in phase when moved angularly, and means for effecting angular adjustment of said shafts for precision adjustment of the lens carrier in the direction of the optical axis.

2. In a photographic camera according to claim 1, said coupling and adjustment means including a lever on one end of each one of said eccentric shafts, at least one of said levers having a sector shape and having rack teeth thereon, a link coupling said levers, and a focus adjusting member including a pinion meshing with said rack teeth for angular adjustment of said eccentric shafts providing precision adjustment of the lens carrier in the direction of the optical axis and having no precision adjustment in the direction perpendicular to that axis.

3. In a photographic camera according to claim 2 and having a range finder having means engaging one of said levers of said eccentric shafts, said lever having a cam surface for controlling said range finder.

4. In a photographic camera according to claim 1, including a reflex mirror pivotally mounted in the camera, said carrier being centrally recessed for receiving said mirror in the active position.

5. In a photographic camera according to claim 1, including twin lenses and a reflecting mirror therein, said lens carrier being combined with a viewing lens arranged above the receiving lens, the said eccentric shafts being located close to the receiving lens.

6. In a photographic camera according to claim 1, including twin lenses and a reflecting mirror therein, said lens carrier being combined with a viewing lens arranged above the receiving lens and having one of said eccentric shafts located above the viewing lens.

References Cited in the file of this patent

UNITED STATES PATENTS

| | | |
|---|---|---|
| 2,305,301 | Maniya | Dec. 15, 1942 |
| 2,333,737 | Parr | Nov. 9, 1943 |
| 2,495,355 | Stahl | Jan. 24, 1950 |
| 2,726,585 | Faulhaber | Dec. 13, 1955 |

FOREIGN PATENTS

| | | |
|---|---|---|
| 735,679 | Great Britain | Aug. 24, 1955 |